United States Patent [19]

Böhm et al.

[11] Patent Number: 4,619,134

[45] Date of Patent: Oct. 28, 1986

[54] TESTING DEVICE FOR FLOW METERS

[75] Inventors: Jürgen Böhm, Mannheim-Wallstadt, Fed. Rep. of Germany; Charles A. Schad, Tulsa, Okla.

[73] Assignee: Bopp & Reuther GmbH, Mannheim, Fed. Rep. of Germany

[21] Appl. No.: 614,732

[22] Filed: May 25, 1984

[30] Foreign Application Priority Data

Dec. 31, 1983 [DE] Fed. Rep. of Germany ....... 3347695

[51] Int. Cl.$^4$ .............................................. G01F 25/00
[52] U.S. Cl. ........................................... 73/3; 73/239
[58] Field of Search ...................................... 73/3, 239

[56] References Cited

U.S. PATENT DOCUMENTS

| 3,270,549 | 9/1966 | Martin | 73/3 |
| 3,344,667 | 10/1967 | Maltby | 73/239 |
| 3,403,544 | 10/1968 | Francisco | 73/3 |

FOREIGN PATENT DOCUMENTS

8229791.6  2/1983  Fed. Rep. of Germany.

*Primary Examiner*—Jerry W. Myracle
*Attorney, Agent, or Firm*—Michael J. Striker

[57] ABSTRACT

Disclosed is a testing device for at least one flow meter installed in a pipeline. The device includes a calibration container connected to the pipeline across a switch-over valve. A measuring piston is guided for reciprocating movement in the container between a starting and a terminal position. The measuring piston supports two signal releasing rings which are spaced apart from the other about a distance which when multiplied by the inner clearance of the calibration container determines a calibration volume of the measuring path of the piston. At least one signal generator is installed in the wall of the calibration container and cooperates in a contactless manner with the first and second signal releasing rings so as to produce start and stop pulses for one measuring cycle. The flow meter is connected to a pulse generator responsive to the flow rate and connected to an evaluation circuit which after completion of a measuring cycle compares the counted pulses with the calibration volume.

10 Claims, 3 Drawing Figures

F I G. 2
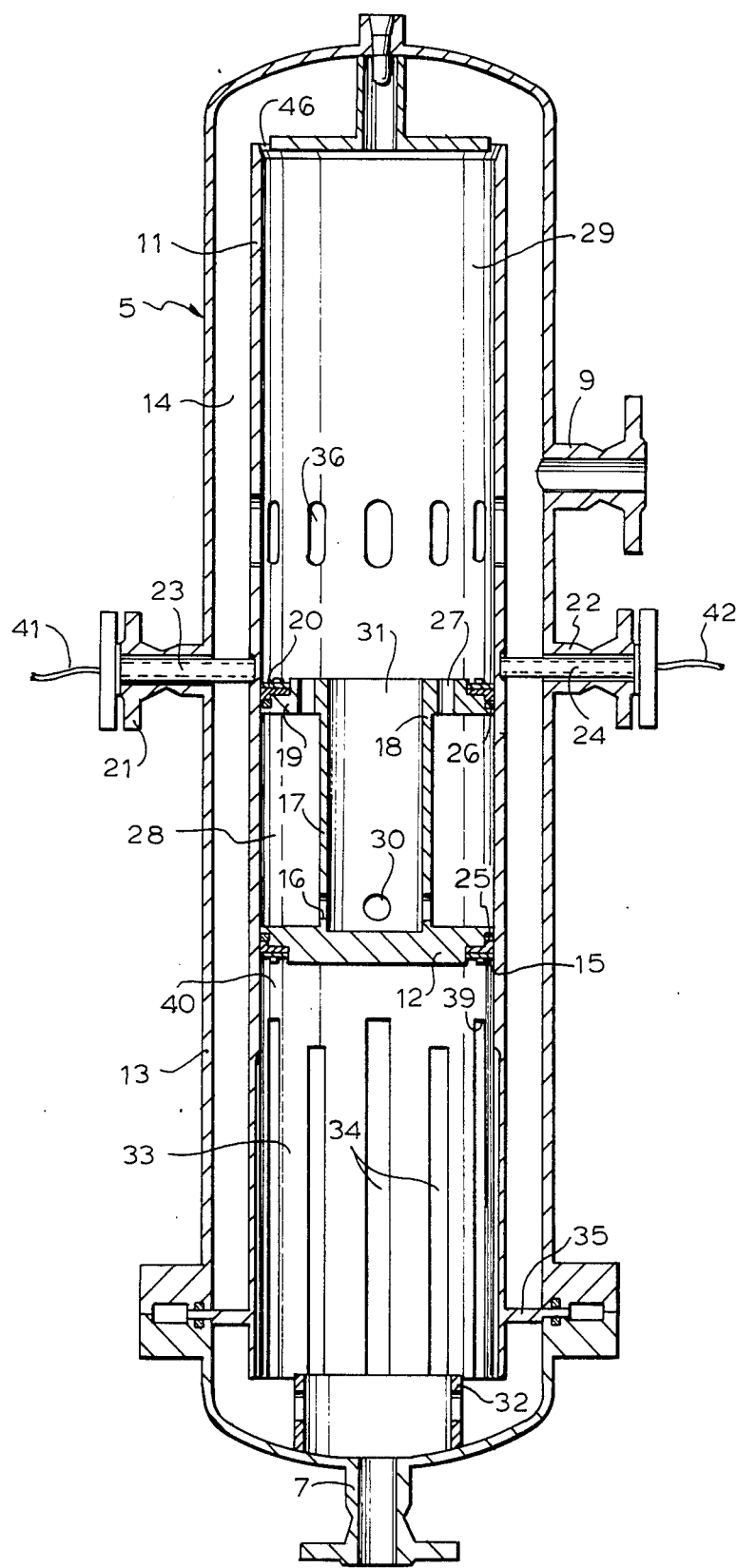

TESTING DEVICE FOR FLOW METERS

BACKGROUND OF THE INVENTION

The invention relates in general to a testing device for a flow meter installed in a pipeline and delivering pulses proportional to the flow of a measured fluid. The device is of the type which includes a cylinderical calibration container communicating with a by-pass conduit, a switch-over valve for selectively connecting the calibration container in series with the flow meter; a measuring piston arranged for movement in the calibration container and being displaceable by the measured fluid along a measuring path; a signal releasing ring mounted on the measuring piston; a signal generator provided in the wall of the calibration container and cooperating with the signal releasing ring so as to produce a start or stop pulse when the measuring piston reaches a starting or an end position on the measuring part, and means responsive to the start/stop pulse for summing up pulses from the flow meter and comparing the sum with a calibration volume defined by the measuring path.

Testing device of this kind is described for example in the German Utility Model Publication No. 8,229,791. In this known device, a signal generator is installed in the wall of the calibration container at the beginning of the measuring path and another signal generator is provided at the end of the measuring path. One of these signal generators produces a start pulse when the measuring piston together with the signal releasing ring passes a starting position, and the other signal generator produces a stop pulse which initiates the summing up of the electric pulses from the tested flow meter.

In this known testing device it has been found that the starting switch frequently does not have an identical geometrical layout and switching behavior as the stop switch. Consequently, due to the different responding times the measuring accuracy of the testing device is impaired. Moreover, in this known testing device only one measuring cycle can be completed during the passage of the measuring piston through the calibration container.

SUMMARY OF THE INVENTION

It is therefore a general object of the present invention to overcome the aforementioned disadvantages.

More particularly, it is an object of the invention to provide an improved testing device of the aforedescribed kind which is independent from the switching behavior of the signal generator and which operates with a greater measuring accuracy.

An additional object of this invention is to provide such an improved testing device which does not require any substantial expenditures for additional component parts and which is constructed without passages through the wall of the calibration container.

In keeping with these objects and others which will become apparent hereinafter, one feature of the invention resides, in a testing device of the beforedescribed kind, in a combination which comprises a second signal releasing ring fixedly arranged on the measuring piston at a distance from the first mentioned signal releasing ring, the distance between the two signal releasing rings being such that when multiplied by the clear cross-section of the calibration container it determines the calibration volume of the measuring path whereby the signal generator which is installed in the wall of the calibration container produces in cooperation with the two signal releasing rings on the measuring piston both the starting pulse and the stop pulse for one measuring cycle.

By virtue of the arrangement of the measuring piston of two signal releasing rings whose mutual distance determines the calibration volume and due to the cooperation of the two signal releasing rings with a common signal generator provided in the wall of the calibration container a delayed switching action of the signal generator which may occur during the start of the testing operation is compensated by an equally delayed switching behavior in stopping the testing operation. As a result a structurally simple and reliable signal generation is achieved. Since the two signal releasing rings can be manufactured without difficulties with exactly equal dimensions, one signal releasing ring on the measuring piston passes the signal generator at the start of the measuring cycle under the same conditions as the other signal releasing ring which passes the signal generator at the end of the measuring cycle and releases the stop signal. Inasmuch as only a single signal generator is employed in the outer jacket of the calibration container, the additional recess in the jacket of the container which hitherto has been necessary for the installation of the second signal generator, is now unnecessary and the corresponding sealing can be dispensed with.

In further elaboration of this invention, there are installed several independent signal generators in the wall of the calibration container, arranged either in series in the longitudinal direction of the container or staggered side by side at the same level in the circumferential direction of the container for carrying out several time shifted and/or simultaneous tests or measuring cycles. The series arranged and/or circumferentially staggered plurality of mutually independent signal generators for performing several time shifted and/or simultaneous measuring cycles make it possible that the same flow meter can be tested several times in sequence during a single passage of the measuring piston through the calibration container. In this case the signal generators are arranged one after the other in the longitudinal direction of the container. In this manner, measuring errors are averaged and the measuring accuracy is increased. The evaluation can be performed by separate evaluation means whereby errors which may occur in individual evaluation devices are mutually neutralized. In the case when a plurality of signal generators are arranged at the same level in the container wall, a corresponding plurality of series connected flow-meters can be simultaneously tested.

When the individual signal generators are spaced apart at a smaller distance than that of the two signal releasing rings on the measuring piston then different measuring cycles which are phase shifted relative to each other can be performed. In this manner, differences in the test result which may occur due to a nonuniform through flow are averaged so that the measuring accuracy is further improved. In the case when several signal generators are arranged in the circumferential direction of the container and mutually staggered than several measuring cycles are tested simultaneously thus enabling to test at a single time point several series connected flow meters. In order to provide sufficient room for the installation of these signal generators in the container jacket, the signal generators are preferably staggered both in the axial and in the radial direction.

A structurally simple mount of the second signal generating ring on the measuring piston is obtained in such a way that the first signal releasing ring on the measuring piston is fixedly connected to one end of a spacer tube which at its opposite end supports a holding ring on which the second signal releasing ring is fixed.

Preferably, the holding ring for the second signal releasing ring is provided with a sliding guide for the measuring piston in the calibration container so as to insure a tilting-free movement of the piston.

In order to further improve the measuring accuracy of the testing device of this invention, the measuring cylinder of the calibration container in the starting range of the piston is provided with a number of circumferentially distributed circulation channels and the holding ring for the second signal releasing ring of the measuring piston has a number of axial through flow openings and/or the spacer tube of the measuring piston has a number of radial through flow openings. In this manner, measured fluid rising in the calibration container and displacing the measuring piston bypasses in the starting range via the circulation channels in the measuring cylinderical wall communicating with the through flow openings in the holding ring and/or in the spacer tube, so that the measuring piston moves with a time delay from the lower end position of its stroke. As a result, sufficient time is provided for closing the switch-over valve and the flow discrepancies occurring in the calibration container due to switching process have sufficient time to quiet down before a signal releasing ring on the circumference on the measuring path passes the signal generator to release a starting pulse.

By this quieting phase in the flow of the measured liquid introduced by the reduced acceleration of the measuring piston, the response accuracy of the testing device is still improved and moreover the structural height of the calibration container due to the slower starting movement of the measuring piston can be reduced. Since the measured liquid during the starting phase of the testing process can freely flow via the through flow opening in the holding ring and in the spacer tube to the outlet from the container a reliably rinsing of the annular chamber between the measuring piston and the holding ring and of the inner space of the spacer tube is achieved so that no polluting particles can accumulate neither in the annular chamber nor in the inner space of the spacer. In addition and intensive temperature equalization between the piston parts and the measuring liquid is hereby obtained.

Preferably the measuring piston of the calibration container in the range of its starting movement is provided on its inner wall with circumferentially distributed circulation grooves which constitute rectilinear throttling channels which are easy to manufacture and along which the liquid can continuously flow without bending. If the longitudinal grooves are of different lengths than in the starting range, the measuring piston is stepwise accelerated so as to attain its final speed in a more uniform manner and the liquid column displaced by the measuring piston is subject to lower pressure impacts. The quieting track adjoining the longitudinal through flow grooves can therefore be made very short without impairing the measuring accuracy of the testing device.

A particular intensive rinsing of the inner space of the spacer tube is obtained in such a manner that the radial through flow openings in the measuring piston are provided in the end portion of the spacer tube directed to the inlet of the calibration container. The measured liquid passing through the inlet at the beginning of the spacer tube rinses the latter along its entire length.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWING

FIG. 2 is a longitudinal section of the calibration container of FIG. 1 inclusive of the measuring piston, shown on an enlarged scale.

DESCRIPTION OF THE PREFERRED EMBODIMENTS

Figure 1:
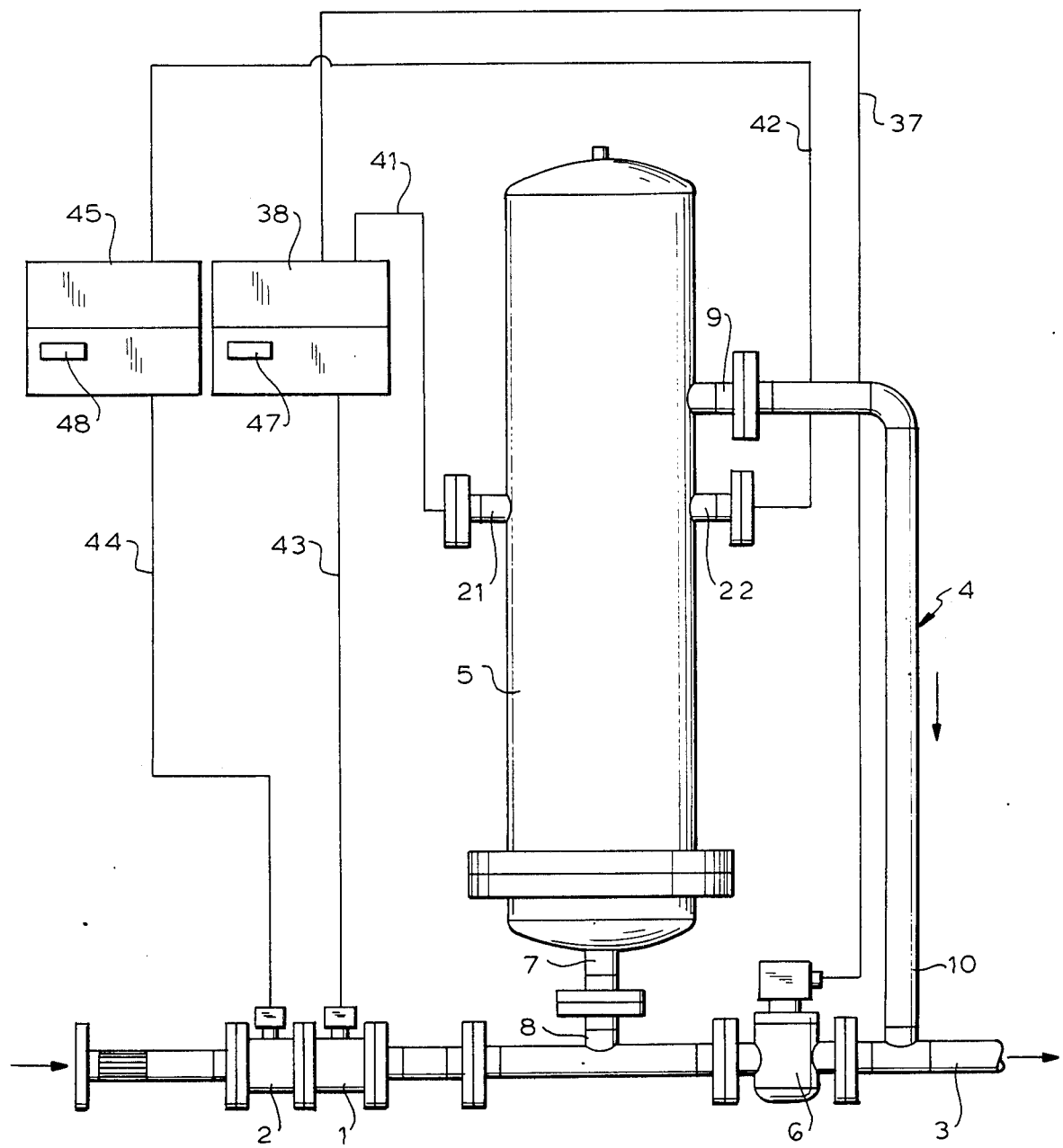
FIG. 1 is an elevational view of the testing device of this invention including a by-pass conduit, a calibration container and a switching valve connected in pipelines.

Referring firstly to FIG. 1 there are illustrated two flow meters 1 and 2, to be tested, the flow meters being connected in series in a pipeline 3 through which a measuring liquid flows in the direction indicated by arrows. The device according to this invention for testing the two flow meters 1 and 2 consists of a cylindrical calibration container 5 connected in an upright position to the pipeline 3 downstream of the flow meters and being connected by a by-pass conduit 4 to a section of the pipeline 3 downstream of a switch-over valve 6 so that after closing the valve 6 test liquid flowing through the pipeline 3 enters from below and flows upwards in the calibration container 5 at a rate which is proportional to the flow rate measured by the two series connected flow meters. The testing liquid enters the calibration container 5 through an inlet connection sleeve 7 which is provided with a connection flange secured to an opposite connection flange of a branch sleeve 8 of the pipeline 3. The testing liquid is discharged through an outlet connection sleeve 9 into the discharge pipe 10 of the by-pass conduit 4 connected to the pipeline 3 downstream of the switch-over valve 6.

The calibration container 5 illustrated in greater detail in FIG. 2, has in its interior a measuring cylinder 11 in which a measuring piston 12 is slidably arranged for a reciprocating movement. An annular pressure equalizing space 14 between the outer surface of the jacket of the measuring cylinder 11 and the inner surface of the calibration container 5 communicates with the inlet sleeve 7 to receive a portion of the pressure fluid counteracting the pressure in the interior of the measuring cylinder 11, thus insuring an accurate fit in guiding the measuring piston 12. The measuring piston is connected at its circumference with a first signal releasing ring 15 and is further connected via a spacer tube 17 to a second signal releasing ring 20. The second signal releasing ring is supported on a holding ring 19 which is secured to the upper end of the spacer tube 17. Both signal releasing rings 15 and 20 consist of a ferromagnetic material and are spaced apart one from the other such a distance that the calibration volume pertaining to the measuring path is enclosed therebetween. The jacket 13 of the calibration container 5 is provided with two connection sleeves 21 and 22 arranged opposite each other at the same height and each accommodating one of two signal generators 23 and 24. Both signal generators 23 and 24 operate independently one from the other and are operated for performing two separate measurements during two simultaneous measuring cycles. In each measuring cycle, during the movement of the upper signal releasing ring past the signal generators a start signal is produced by both signal generators 23 and 24 and during the passage of the lower signal releasing ring a stop signal for both measuring cycles is released.

The measuring piston 12 is sealingly guided within the measuring cylinder 11 by a set of piston rings 25 whereas holding ring 19 which is firmly connected to the measuring piston 12 by the spacer tube 17 supports a guiding slide ring 26 which protects the measuring piston 12 against canting in the cylinder 11. The holding ring 19 which supports the upper or second signal releasing ring 20 is provided with a number of axial through flow openings 27 connecting an annular chamber 28 between the measuring piston 12 and holding ring 19 with the superposed upper space portion 29 of the measuring cylinder. In addition, the spacer tube 17 is provided with a number of radial through flow openings 30. Through these through flow openings 27 and 30, the annular chamber 28 and also the inner space 31 of the spacer tube 17 are rinsed when the test liquid flows around measuring piston 12 as it will be explained below.

The measuring piston 12 at the beginning of the measuring process rests on the lower pipe section 32 surrounding the inlet sleeve 7 and serving as a stroke limiting abutment. In the starting range 33 of the path of movement of the measuring piston, the measuring cylinder 11 is provided on its inner wall with a number of longitudinal grooves 34 which are uniformly distributed around a circumference of the measuring cylinder and terminating at different levels. A radially directed partition 35 which is integrally connected to the lower portion of the measuring cylinder 11, is clamped to the jacket of the calibration container 5 and serves for supporting the measuring cylinder 11 in its upright centered position relative to the container 5 and simultaneously separates the incoming test liquid portion in the lower part of the cylinder 11 from the liquid portion to be discharged from the upper part 29 of the cylinder. The discharge of the liquid displaced by the piston 12 occurs through the discharge openings 36 in the jacket of the measuring cylinder 11.

The embodiment of the testing device illustrated in FIGS. 1 and 2 operates as follows:

Before the beginning of the testing process the switch-over valve 6 is in its open position so that the testing liquid flows straight through the entire length of the pipeline 3. The measuring piston 12 rests on its lower stroke end position on the tubular section 32. At the beginning of the testing process the switch-over valve 6 is closed by means of a control device 38 connected to the valve 6 by control conduit 37. In the closed position of the switch-over valve 6 the entire stream of testing liquid passing through the flow meters 1 and 2 flows through the calibration container 5 into the by-pass branch 4. The test liquid flowing through the inlet sleeve 7 in the calibration container 5 displaces the measuring piston 12 upwards whereby a portion of the test liquid flows around the measuring piston 65 through the longitudinal grooves 34 in the inner wall of the measuring cylinder 11 which act as throttling passages. Due to the circulation of the test liquid around the measuring piston at the initial portion of its path of movement, the piston starts moving upwardly with a time delay and consequently sufficient time is provided for the completion of the closing of the switch-over valve 6 and for quieting the flow of test liquid which has been agitated by the switching process, before the actual measuring cycle is initiated by the passage of the second signal releasing ring 20 past the signal generators 23 and 24.

Partial stream of the test liquid flowing via the longitudinal grooves 34 around the measuring piston 12 enters through the through flow openings 27 in the holding ring 19 and via through flow openings 30 in the spacer tube 17 the upper space part 29 in the measuring cylinder 11 and is free to overflow via openings 36 in the jacket of the cylinder 11 into the annular space 14 up to the discharge sleeve 9 in the jacket of the calibration container 5. Measuring piston 12 is displaced upwards and after passing the ends 39 of longitudinal grooves 34 it is accelerated to its final speed. Due to the different levels of the ends 39 of longitudinal grooves 34, the acceleration of the piston occurs in steps and therefore in a more uniform manner. The quieting zone 40 adjoining the ends of the longitudinal grooves 34 can therefore be designed substantially shorter than the throttling start zone 33 of the piston path.

When the measuring piston is displaced by the test liquid to such a distance that the upper signal releasing ring 20 overrides the two signal generators 23 and 24 and changes in a contactless manner the magnetic fields of the latter. Most generators produce a start pulse which is applied via control conduits 41 and 42 to the evaluation parts of control circuits 38 and 45 where the adding of pulses coming from the two flow meters 1 and 2 is initiated. Pulses transmitted via the conduit 43 from flow meter 1 are applied to an evaluating part of the circuit 38 whereas the adding of pulses coming from the flow meter 2 via a separate conduit 44 are counted in another evaluating part of the circuit 45. When the calibration volume of the measuring path is displaced by the measuring piston 12 the lower signal releasing ring 15 overrides the two signal generators 23 and 24 whereby a stop signal is transmitted via the two control conduits 41 and 42 to the evaluation circuits 48 and 45 and the counting of pulses from the flow meters 1 and 2 is interrupted. Simultaneously the evaluating and control circuit 48 automatically starts to open the switch-over valve 6 in response to a control signal transmitted via control conduit 37. During the opening process of the switch-over valve the measuring piston 12 continues moving upwardly whereby after overriding openings 36 in the jacket of the measuring piston 11, only the upper throttling outlet 46 is left open, and the movement of the piston becomes intensively dampened.

In the two evaluation circuits 38 and 45 the counted amount of liquid corresponding to the sum of the added pulses from respective flow meters is compared with calibrating volume of the measuring path and the measuring error of both flow meters 1 and 2 is read in indicator windows 47 and 48. When the switch-over valve is again fully opened, the measuring piston 12 falls by its own weight back into its starting position on the limit stop 32.

Figure 3:
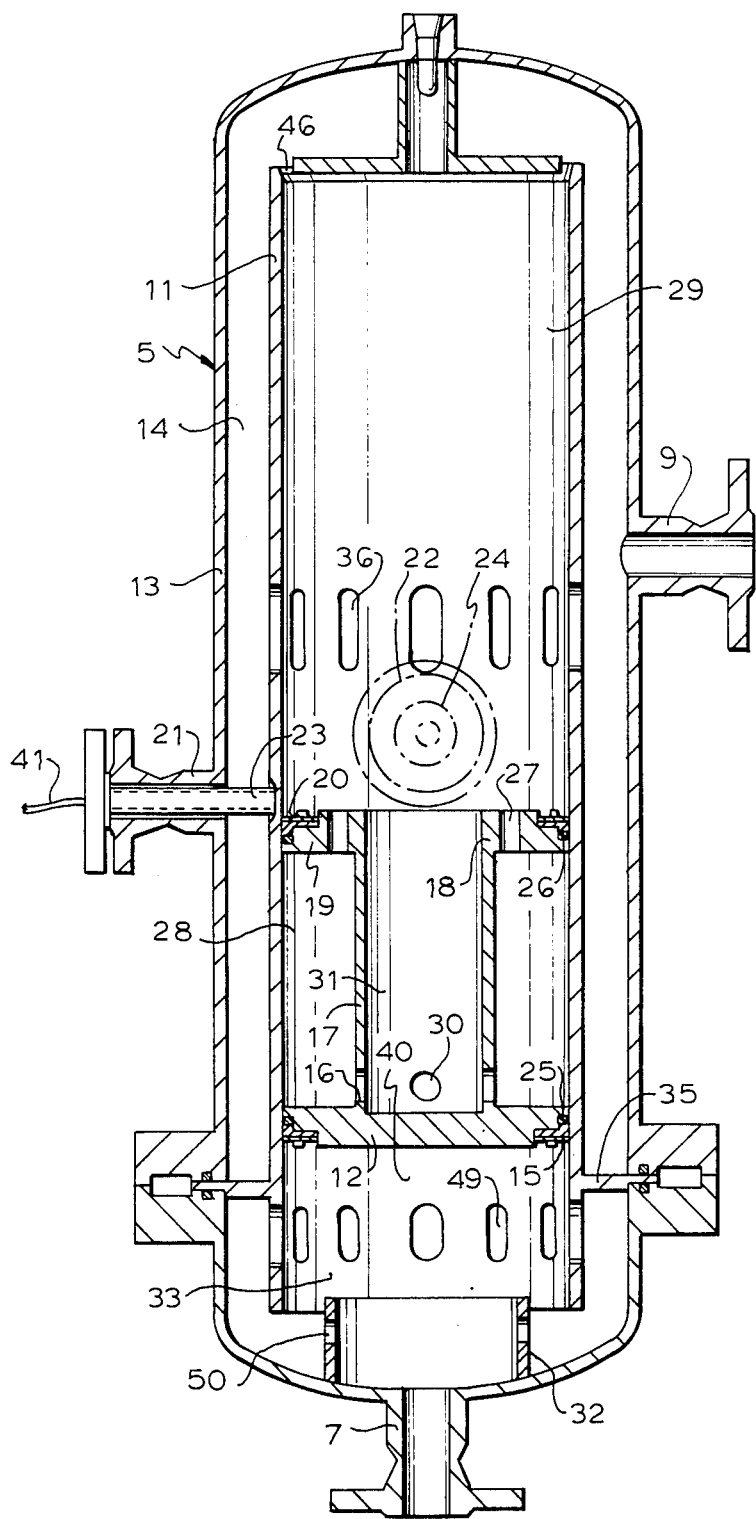
FIG. 3 is a longitudinal section of a modified version of the calibration container with the measuring piston.

In the embodiment according to FIG. 3, the calibration container 5 is reduced in length whereby the starting section 33 of the piston upward movement is made shorter. Instead of the through flow longitudinal grooves there are provided in the lower portion of the measuring cylinder 11 through flow slots 49 so that the measuring piston 12 during the initial phase of its upward movement is bypassed by a partial stream of test liquid via the bores 50 in the lower part of the tubular section 32 and via the through flow slots 49. Also in this embodiment the piston starts its stroke with reduced acceleration until the through flow slots 49 are completely overridden by the piston ring 25 on the piston 12. Only then the measuring piston 12 attains its full final acceleration in the quieting zone 40 in the measuring cylinder 11. Due to the short starting section 33 the switch-over valve 6 must be constructed as a fast closing valve. The calibration container 5 in the embodiment according to FIG. 3 is provided with two connection sleeves 21 and 22' arranged at different levels when viewed in the direction of movement of the measuring piston 12 and being mutually shifted by 90° in circumferential direction of the jacket of container 5. Each connection sleeve 21 and 22' accommodates one of signal generators 23 and 24', the latter operating independently one of the other. The signal generators thus control two time shifted or successive measuring cycles of the flowmeter whereby during movement of the upper signal releasing ring 20 past the successive signal generators corresponding start signals are generated while during passing of the lower signal releasing ring 15 the stop signals for respective measuring cycles are released.

It will be understood that each of the elements described above, or two or more together, may also find a useful application in other types of constructions differing from the types described above.

While the invention has been illustrated and described as embodied in specific examples of flow meter testing devices, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A device for testing at least one flow meter installed in a pipeline, comprising means coupled to the flow meter for delivering pulses indicative of the rate of flow of a liquid in the pipeline, a switch-over valve arranged in the pipeline downstream of the flow meter, a by-pass conduit bridging the switch-over valve, a calibration container having an inlet and an outlet connected one after the other in said by-pass conduit, a measuring piston provided in said calibration container for movement between a starting position close to said inlet and a terminal position close to said outlet of the container, a first signal releasing ring mounted on the measuring piston, a signal generator installed in the wall of the calibration container between said inlet and outlet, a second signal releasing ring arranged on the measuring piston at a fixed distance from said first releasing ring, the fixed distance being such that when multiplied by the inner cross-section of the calibration container it determines the calibration volume of the measuring path of the measuring piston, said signal generator cooperating with said first and second signal releasing rings in such a manner that when said second signal releasing ring reaches the level of the signal generator the latter produces a start signal and when the first signal releasing ring reaches the signal generator the latter produces a stop signal for a measuring cycle, and evaluation means connected to said means for delivering pulses from said flow meter, said evaluation means being connected to said signal generator for counting the pulses from the flow meter in response to said start signal and for comparing the count with the calibration volume in response to said stop signal.

2. A device for testing at least one flow meter installed in a pipeline, comprising means coupled to the flow meter for delivering pulses indicative of the rate of flow of a liquid in the pipeline, a switch-over valve arranged in the pipeline downstream of the flow meter, a by-pass conduit bridging the switch-over valve, a calibration container having an inlet and an outlet connected one after the other in said by-pass conduit, a measuring piston provided in said calibration container for movement between a starting position close to said inlet and a terminal position close to said outlet of the container, a first signal releasing ring mounted on the measuring piston, a signal generator installed in the wall of the calibration container between said inlet and outlet, a second signal releasing ring arranged on the measuring piston at a fixed distance from said first releasing ring, the fixed distance being such that when multiplied by the inner cross-section of the calibration container it determines the calibration volume of the measuring path of the measuring piston, said signal generator cooperating with said first and second signal releasing rings in such a manner that when said second signal releasing ring reaches the level of the signal generator the latter produces a start signal and when the first signal releasing ring reaches the signal generator the latter produces a stop signal for a measuring cycle, and evaluation means connected to said means for delivering pulses from said flow meter, said evaluation means being connected to said signal generator for counting the pulses from the flow meter in response to said start signal and for comparing the count with the calibration volume in response to said stop signal, and wherein the second signal releasing ring is secured to the circumference of the measuring piston, said measuring piston being connected to one end of a concentrically arranged spacer tube which supports at its other end a holding ring on which the first signal releasing ring is mounted.

3. A testing device as defined in claim 2, wherein said holding ring is provided with a sliding guide engaging the inner wall of the calibrating container.

4. A testing device as defined in claim 2, wherein the inner wall of the calibration container in the range of said starting position of the measuring piston is formed with a plurality of axially directed grooves forming through flow channels for the liquid, and the holding ring for supporting the first signal releasing ring is provided with a plurality of axially directed through flow openings.

5. A testing device as defined in claim 4, wherein the axially directed longitudinal grooves in the inner wall of the calibration container are of different length to cause a stepwise acceleration of the movement of the measuring piston.

6. A testing device as defined in claim 4 wherein the spacer tube on the measuring piston is provided with a plurality of radially directed through-flow openings.

7. A testing device as defined in claim 2, wherein said calibration container includes an inner cylinder accommodating said measuring piston, said inner cylinder in the range of the starting position of said piston being formed with a plurality of through flow openings distributed along a circumference, the through flow openings having an elongated configuration oriented in the direction of movement of the piston.

8. A testing device as defined in claim 7, wherein said spacer tube is provided with a plurality of radially directed through flow openings located in proximity to said measuring piston.

9. A device for testing a plurality of flow meters installed in a pipeline, comprising means coupled to the flow meters for delivering pulses indicative of the rate of flow of a liquid in the pipeline, a switch-over valve arranged in the pipeline downstream of the flow meters, a by-pass conduit bridging the switch-over valve, a calibration container having an inlet and an outlet connected one after the other in said by-pass conduit, a measuring piston provided in said calibration container for movement between a starting position close to said inlet and a terminal position close to said outlet of the container, a first signal releasing ring mounted on the measuring piston, a plurality of separate signal generators installed at the same level in the wall of the calibration container between said inlet and outlet, a second signal releasing ring arranged on the measuring piston at a fixed distance from said first releasing ring, the fixed distance being such that when multiplied by the inner cross-section of the calibration container it determines the calibration volume of the measuring path of the measuring piston, said signal generators cooperating with said first and second signal releasing rings in such a manner that when said second signal releasing ring reaches the level of the signal generators each generator produces a start signal and when the first signal releasing ring reaches the signal generators each generator produces a stop signal for simultaneous measuring cycle, and evaluation means connected to said means for delivering pulses from said flow meters, said evaluation means being connected to said signal generators for counting the pulses from respective flow meters in response to said start signals and for comparing the counts with the calibration volume in response to said stop signals.

10. A device for testing at least one flow meter installed in a pipeline, comprising means coupled to the flow meter for delivering pulses indicative of the rate of flow of a liquid in the pipeline, a switch-over valve arranged in the pipeline downstream of the flow meter, a by-pass conduit bridging the switch-over valve, a calibration container having an inlet and an outlet connected one after the other in said by-pass conduit, a measuring piston provided in said calibration container for movement between a starting position close to said inlet and a terminal position close to said outlet of the container, a first signal releasing ring mounted on the measuring piston, a plurality of signal generators installed one after the other in the wall of the calibration container between said inlet and outlet, a second signal releasing ring arranged on the measuring piston at a fixed distance from said first releasing ring, the fixed distance being such that when multiplied by the inner cross-section of the calibration container it determines the calibration volume of the measuring path of the measuring piston, said signal generators cooperating with said first and second signal releasing rings in such a manner that when said second signal releasing ring reaches the level of a signal generator the latter produces a start signal and when the first signal releasing ring reaches a signal generator the latter produces a stop signal for a measuring cycle, and evaluation means connected to said means for delivering pulses from said flow meter, said evaluation means being connected to respective signal generators for counting the pulses from the flow meter in response to said start signals and for comparing the count with the calibration volume in response to said stop signals to control several time shifted measuring cycles for said at least one flowmeter.

* * * * *